Sept. 27, 1932. E. I. SPONABLE 1,879,573
COMBINED MOVING PICTURE AND SOUND CAMERA
Filed Nov. 1, 1928  3 Sheets-Sheet 2
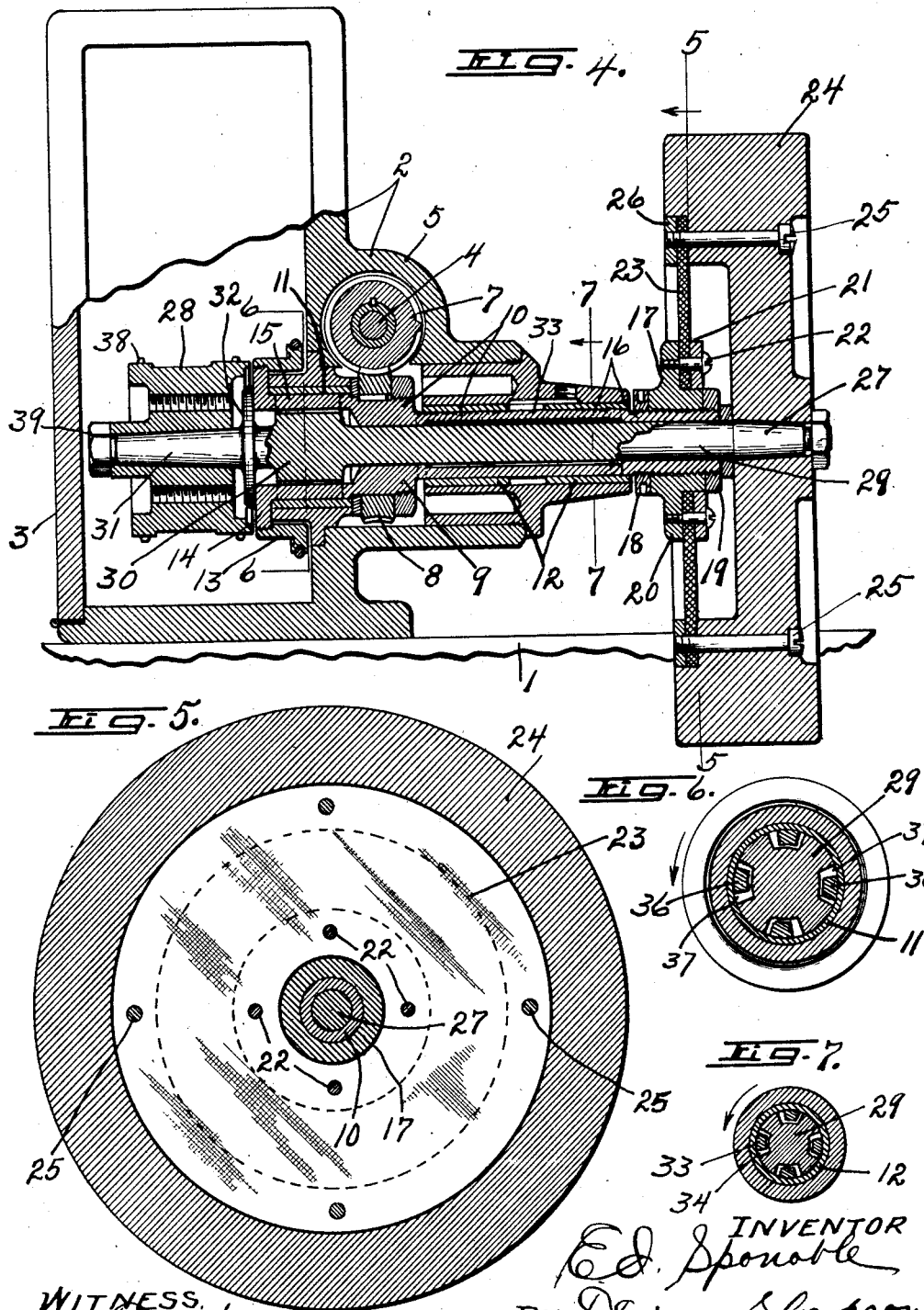

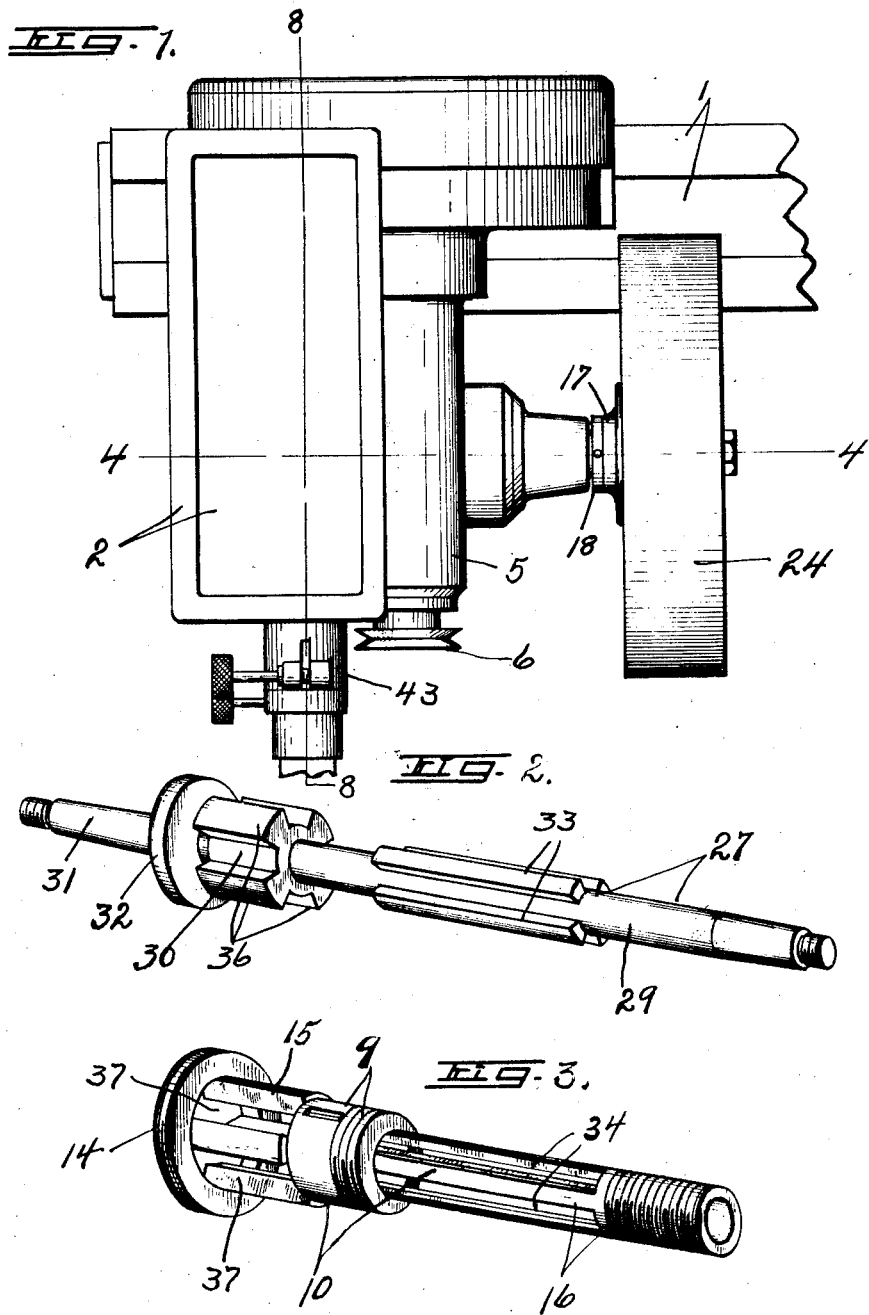

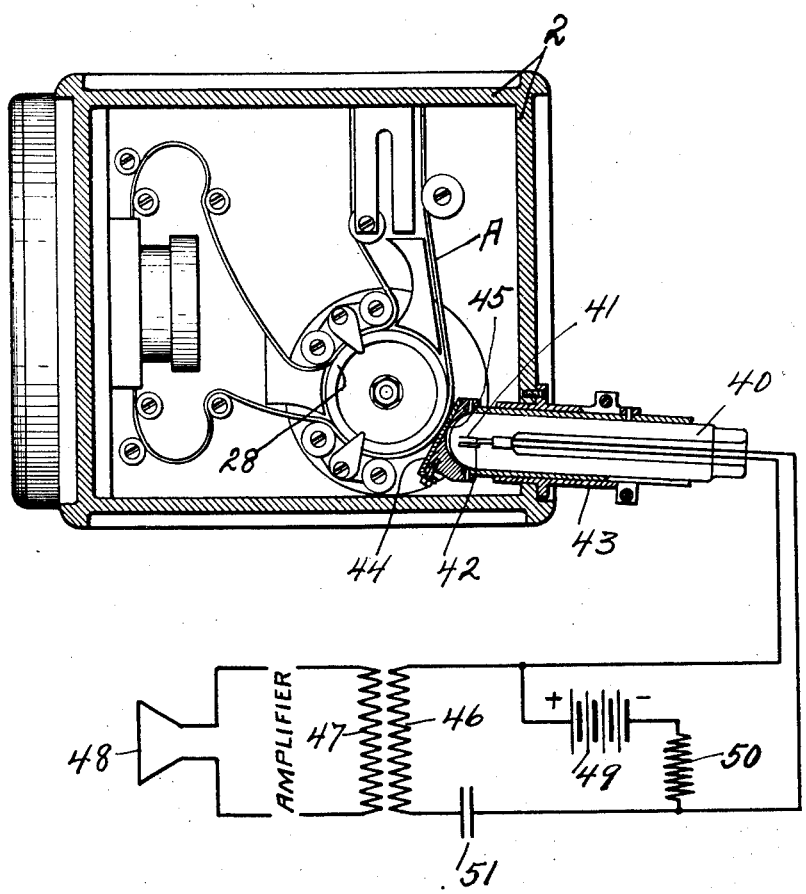

Patented Sept. 27, 1932

1,879,573

UNITED STATES PATENT OFFICE

EARL IRA SPONABLE, OF NEW YORK, N. Y., ASSIGNOR TO FOX CASE CORPORATION, OF NEW YORK, N. Y., A CORPORATION OF NEW YORK

COMBINED MOVING PICTURE AND SOUND CAMERA

Application filed November 1, 1928. Serial No. 316,541.

This invention relates to certain new and useful improvements in combined moving pictures and sound cameras.

In the usual moving picture camera in which the shutter shaft is directly driven from any suitable source of power; and the feed and take-up sprocket shaft is driven by suitable gearing from the shutter shaft, the sprocket shaft is affected by any irregularities in the movement of the shutter shaft and thereby injuriously affects the production of an accurate and perfect sound record upon a sensitized element or film as the film is being moved around the feed and take-up sprocket.

Where the shutter shaft drives a hollow shaft within which the sprocket shaft is mounted it is found that frictional contact of the sprocket shaft with the driven hollow shaft tends to drive the sprocket shaft so that irregularity in the movement of the hollow shaft is communicated to the sprocket shaft irrespective of whether or not the driving connection between the hollow shaft and the sprocket shaft includes a filtering device.

The main object of this invention is to provide a filtering driving connection between the shutter-shaft and the sprocket shaft in the usual moving picture camera so that any mechanical pulses or irregularity in the movement of the shutter shaft will not be transmitted to the sprocket shaft thereby effecting a steady, uniform rotary movement of the sprocket shaft together with the feed and take-up sprocket mounted thereon.

This may be accomplished by forming the sprocket shaft generally of slightly less external diameter than the corresponding interior diameter of the hollow shaft through which it extends and also providing the sprocket shaft with radial bearing projections extending through openings in the wall of the hollow shaft so that both shafts are mounted for limited independent or relative rotary movement in the same bearings.

This steady, smooth and uniform rotary movement of the sprocket is particularly desirable and necessary when a sound picture, that is a picture of light wave variations as produced by electrical variations conforming to sound wave variations, is being taken while the moving picture film or sensitized surface is moved around and in contact with the feed and take-up sprocket.

Other objects and advantages relate to the details of the structure and the form and relation of the parts thereof all as will more fully appear from the following description taken in connection with the accompanying drawings, in which:

Figure 1 is a top plan view of a motion picture camera embodying the various features of my invention.

Figure 2 is a perspective view of the sprocket shaft.

Figure 3 is a perspective view of the tubular drive shaft.

Figure 4 is a section on the plane of the line 4—4, Figure 1.

Figure 5 is a section on line 5—5, Figure 4.

Figure 6 is a detail section view taken in the plane of line 6—6, Figure 4.

Figure 7 is a detail section view taken on line 7—7, Figure 4.

Figure 8 is a section on line 8—8, Figure 1, illustrating the position at which the sound record is produced.

The apparatus consists of a base —1— upon which is mounted the camera case —2— which is of a rectangular box-shape having a door —3— hinged to its front side, while a shutter shaft —4— is journaled in a cylindrical case 5 cast or otherwise secured to the rear side of the camera case —2—.

The shutter shaft —4— may be driven in any suitable manner as by a motor connected by a belt (not shown) to the grooved pulley —6— mounted in the usual manner on the outer rear end of the shutter shaft —4—.

Keyed or otherwise secured to the shutter shaft —4— and positioned a short distance ahead of the rear end thereof is a worm —7— which meshes with and drives a worm gear —8— keyed or otherwise secured to an enlarged intermediate portion —9— of a hollow drive shaft 10 rotatably mounted in bearings 11 and 12 carried by the rear side wall of the camera case —2—. A take-up pulley —13— is secured to an enlarged annular flange —14— located at the inner end of the hollow drive shaft 10 and positioned just inside the bearing —11—. The take-up pulley —13— being positioned just inside the rear wall of the case —2— and rotates with the hollow shaft 10.

Between the flange 14 and the worm gear supporting portion —9— of the hollow drive shaft 10 is a gearing portion —15— adapted to be rotatably mounted in the forward bearing —11— and in this instance is slightly greater in diameter than the gear carrying portion —9— but of less diameter than the flange —14—. The remaining portion —16— of the hollow drive shaft —10— extendng from the portion —9— rearward is of somewhat less diameter than said portion —9— and extends a sufficient distance beyond the outer end of the bearing —12—, in which it is rotatably mounted, to permit a drive collar —17— to be adjustably mounted thereon and this collar may be locked in any adjusted position so as to cause the drive collar —17— and its cooperating parts to rotate with said drive shaft 10 by means of lock nuts —18— and —19— positioned one on either side of the collar —17—.

The drive collar —17— may be provided with an outwardly extending annular flange —20— to which is secured by means of the annular ring or washer —21— and screws —22— a comparatively thin yielding drive plate or disk —23— composed of some flexible material such as fabric treated with rubber as for instance rubber belting or any other suitable material or composition of materials so as to form a yielding driving connection between the collar —17— and a balance or fly-wheel —24— to which the drive plate —23— is secured near its outer edge by means of screws —25— passing through suitable holes in the fly-wheel —24— and the drive plate —23— and threaded into an annular plate —26—located on the opposite side of the drive plate from the fly-wheel.

The fly-wheel —24— is secured to the outer rear end of the sprocket drive shaft —27— which is rotatably mounted within the hollow drive shaft —10— and extends through and beyond the inner end of said hollow shaft and is adapted to operate a feed and take-up sprocket —28— which is mounted thereon and rotates with said shaft.

The sprocket shaft —27— in this instance consists of three portions, a relative long reduced rear portion —29— of sufficient diameter to be loosely mounted within the rear portion —16— and gear support —9— of the hollow shaft —10—, a somewhat enlarged and relatively short portion —30— of sufficient diameter to be loosely mounted within the forward bearing portion —15— of said hollow shaft —10—, and a tapered forward portion —31— which extends inward from the hollow shaft within the case —2— and upon which the feed and take-up sprocket —28— is mounted. The sprocket shaft —27— is also provided with an enlarged annular flange —32— located between the tapered portion —31— and the enlarged portion —30— and which is normally positioned against the inner face of the annular flange —14— of the hollow shaft —10— and limits the outer longitudinal movement of said sprocket shaft.

The sprocket shaft —27— is also journaled in the bearings —11— and —12— in which the hollow shaft —10— is journaled to reduce the friction between the two shafts to a minimum so that all the driving of the sprocket shaft will be done through the flexible yielding drive plate —23— and the flywheel —24— thereby permitting said drive plate to absorb or filter any mechanical pulses or irregularity of movement of the hollow shaft from any cause whatsoever, as by any variation in the speed of the driving motor, or to varying air pockets adjacent the shutter shaft or to any mechanical pulses developed in the driving gears.

The journaling of the sprocket shaft in the bearings —12— is accomplished through the medium of a plurality of in this instance four longitudinal radial flanges or lugs —33— spaced circumferentially from each other and secured to or integral with the reduced portion —29— of the sprocket shaft —27— and extend through a corresponding number of longitudinal radial slots or apertures —34— located in the rear portion —16— of the hollow shaft —10—. The slots —34— are preferably of greater width than the flanges —33— as indicated in Figure 7 so as to permit a certain amount of circumferential movement of the hollow shaft in relation to the sprocket shaft without in any way transmitting motion to said sprocket shaft.

The forward portion of the sprocket shaft is likewise journaled in the bearing —11— by means of a plurality of in this instance four longitudinal flanges or lugs —36— secured to or integral with the enlarged portion —30— of said sprocket shaft and adapted to extend through a like number of longitudinal slots or apertures —37— located in the enlarged portion 15 of the hollow shaft 10. The slots —37— being of greater width than the flanges 36 for the same reason as explained in connection with the slots —34— thereby permitting the hollow shaft to revolve to a certain degree without in any way transmitting motion directly to the sprocket shaft —27—.

In view of the fact that sprocket shaft —27— does not contact with the hollow shaft 10 and that the shafts are separately journaled in the same bearings and are capable of limited relative movement there is no force exerted on shaft 10 tending to rotate it except that transmitted through filter disk 23 and any irregularity of movement of hollow shaft 10 is not communicated to the sprocket shaft.

The sprocket —28— is positioned within the case —2— in the usual manner, and may, as shown, consist of a cylinder formed with spaced rows of teeth —38— upon the periphery thereof for engaging the usual openings in a moving picture film. This cylinder may be mounted in any suitable manner upon the sprocket shaft —27— as by forcing it upon the tapered end thereof by means of the nut —39— threaded to the inner end of said shaft for simultaneous rotation therewith.

A source of light, as a lamp —40— (Figure 8) including two spaced electrodes —41— and —42— is enclosed in an adjustable casing —43— penetrating the rear end wall of the casing —2— of the camera and provided at its front end with a plate —44— disposed tangential to the feed and take-up sprocket —28— and having a narrow elongated slit —45— through which light from the lamp —40— can pass to the film A. The lamp or source of light —40— is modulated in accordance with sound waves so that the record produced on the film while moving around the feed and take-up sprocket —28— will conform to sound waves in any suitable manner, as by connecting the electrodes —41— and —42— in circuit with the primary —46— of a transformer, the secondary —47— of which through any number of stages of amplification is connected in circuit with a microphone —48. The source of light is maintained constantly lit, as by means of a battery —49— connected across the primary —46— of the transformer and a resistance —50— may be provided, if desired.

In order to prevent the lighting current from flowing through the primary —46— of the transformer a condenser —51— may be provided.

As before stated, it is essential that the film shall move in a regular and uniform manner while the sound record is being produced if an accurate, sharply defined record is to be produced, and it is this fact that necessitates the driving of the feed and take-up sprocket in a steady and uniform manner in order that the film may be carried past the slit —45— regularly, steadily and uniformly and this is accomplished by the yielding driving connection between the hollow drive shaft and fly-wheel in the manner hereinbefore described.

Altho I have shown and particularly described the preferred embodiment of my invention, various changes may readily be made without departing from the spirit of this invention as set forth in the appended claims.

What I claim is:

1. In a camera, a driving mechanism comprising a tubular shaft, a sprocket shaft within the tubular shaft, and a bearing in which both of said shafts are journaled having a bearing surface common to both shafts.

2. In a camera, a driving mechanism comprising a tubular shaft, a sprocket shaft within the tubular shaft, and spaced bearings in which both of said shafts are journaled, each of said bearings having a bearing surface common to both shafts.

3. In a camera, a driving mechanism comprising a tubular shaft, a sprocket shaft within the tubular shaft and spaced radially from the tubular shaft, and spaced bearings in which both of said shafts are journaled, each of said bearings having a bearing surface common to both shafts.

4. In a camera, a driving mechanism comprising a tubular shaft, a sprocket shaft within the tubular shaft, a bearing in which both of said shafts are journaled having a bearing surface common to both shafts, and means for limiting relative rotary movement of said shafts.

5. In a camera, a driving mechanism comprising a tubular shaft, a sprocket shaft within the tubular shaft, spaced bearings in which both of said shafts are journaled, each of said bearings having a bearing surface common to both shafts, and means for limiting relative rotary movement of said shafts.

6. In a camera, a driving mechanism comprising a tubular shaft, a sprocket shaft within the tubular shaft and spaced radially from the tubular shaft, spaced bearings in which both of said shafts are journaled, and means for limiting relative rotary movement of said shafts.

7. In a camera, a driving mechanism comprising a tubular shaft, a sprocket shaft within the tubular shaft, a bearing in which both of said shafts are journaled having a bearing surface common to both shafts, and means for driving the sprocket shaft from the hollow shaft.

8. In a camera, a driving mechanism comprising a tubular shaft, a sprocket shaft within the tubular shaft, and spaced bearings in which both of said shafts are journaled, each of said bearings having a bearing surface common to both shafts, and means for driving the sprocket shaft from the hollow shaft.

9. In a camera, a driving mechanism comprising a tubular shaft, a sprocket shaft within the tubular shaft and spaced radially from the tubular shaft, spaced bearings in which both of said shafts are journaled, each of said bearings having a bearing surface common to both shafts, and means for driving the sprocket shaft from the hollow shaft.

10. In a camera, a driving mechanism comprising a tubular shaft, a sprocket shaft within the tubular shaft, a bearing in which both of said shafts are journaled having a bearing surface common to both shafts, means for limiting relative rotary movement of said shafts, and means for driving the sprocket shaft from the hollow shaft.

11. In a camera, a driving mechanism comprising a tubular shaft, a sprocket shaft within the tubular shaft, spaced bearings in which both of said shafts are journaled, each of said bearings having a bearing surface common to both shafts, means for limiting relative rotary movement of said shafts, and means for driving the sprocket shaft from the hollow shaft.

12. In a camera, a driving mechanism comprising a tubular shaft, a sprocket shaft within the tubular shaft and spaced radially from the tubular shaft, spaced bearings in which both of said shafts are journaled, each of said bearings having a bearing surface common to both shafts, means for limiting relative rotary movement of said shafts, and means for driving the sprocket shaft from the hollow shaft.

13. In a camera, a driving mechanism comprising a tubular shaft, a sprocket shaft within the tubular shaft, a bearing in which both of said shafts are journaled having a bearing surface common to both shafts, means for transferring rotary motion from the hollow shaft to the sprocket shaft including a flexible disc, and a balance wheel secured to the disc.

14. In a camera, a driving mechanism comprising a tubular shaft, a sprocket shaft within the tubular shaft, spaced bearings in which both of said shafts are journaled, each of said bearings having a bearing surface common to both shafts, means for transferring rotary motion from the hollow shaft to the sprocket shaft including a flexible disc, and a balance wheel secured to the disc.

15. In a camera, a driving mechanism comprising a tubular shaft, a sprocket shaft within the tubular shaft and spaced radially from the tubular shaft, spaced bearings in which both of said shafts are journaled, each of said bearings having a bearing surface common to both shafts, means for transferring rotary motion from the hollow shaft to the sprocket shaft including a flexible disc, and a balance wheel secured to the disc.

16. In a camera, a driving mechanism comprising a tubular shaft, a sprocket shaft within the tubular shaft, a bearing in which both of said shafts are journaled having a bearing surface common to both shafts, means for limiting relative rotary movement of said shafts, means for transferring rotary motion from the hollow shaft to the sprocket shaft including a flexible disc, and a balance wheel secured to the disc.

17. In a camera, a driving mechanism comprising a tubular shaft, a sprocket shaft within the tubular shaft, spaced bearings in which both of said shafts are journaled each of said bearings having a bearing surface common to both shafts, means for limiting relative rotary movement of said shafts, means for transferring rotary motion from the hollow shaft to the sprocket shaft including a flexible disc, and a balance wheel secured to the disc.

18. In a camera, a driving mechanism comprising a tubular shaft, a sprocket shaft within the tubular shaft and spaced radially from the tubular shaft, spaced bearings in which both of said shafts are journaled each of said bearings having a bearing surface common to both shafts, means for limiting relative rotary movement of said shafts, means for transferring rotary motion from the hollow shaft to the sprocket shaft including a flexible disc, and a balance wheel secured to the disc.

19. In an apparatus of the class described, a casing, a shaft journaled in the casing, a hollow shaft journaled in the casing formed with a plurality of slots, a flexible disc mounted on the hollow shaft, a balance wheel secured to the flexible disc, a third shaft extending through and spaced from the hollow shaft and provided with a plurality of projecting ribs extending through said slots, means for connecting the third shaft to the balance wheel, bearings in which both the hollow shaft and the third shaft are journaled, means for limiting relative rotary movement between the hollow shaft and the third shaft, and means for driving the hollow shaft from the first-named shaft.

20. In a camera, a driving mechanism comprising a tubular shaft having a plurality of slots, a second shaft extending through and spaced from said tubular shaft and having a plurality of projecting ribs extending through said slots, and a bearing in which said slotted and said ribbed portions of said shafts are journaled.

21. In a camera, a driving mechanism comprising a tubular shaft having a plurality of slots, a second shaft extending through and spaced from said tubular shaft and having a plurality of projecting ribs extending through said slots, and spaced bearings in which said slotted and ribbed portions of said shafts are journaled.

22. In a camera, a driving mechanism comprising a tubular shaft having two spaced portions of different diameter in which are provided a plurality of slots, a second shaft extending through and spaced from said tubular shaft and having a plurality of projecting ribs extending through said slots, and spaced bearings in which said slotted and said ribbed portions of said shafts are journaled.

23. In a camera, a driving mechanism comprising a tubular shaft having a plurality of slots extending through the walls thereof, a second shaft positioned within the tubular shaft and having ribs extending into the slots of the tubular shaft and terminating flush with the periphery of the tubular shaft, and a bearing in which said slotted and said ribbed portions of said respective shafts are journaled.

In witness whereof I have hereunto set my hand this 22nd day of October 1928.

EARL I. SPONABLE.